E. E. BJORLING.
CAMERA SHUTTER OPERATING DEVICE.
APPLICATION FILED FEB. 7, 1916.

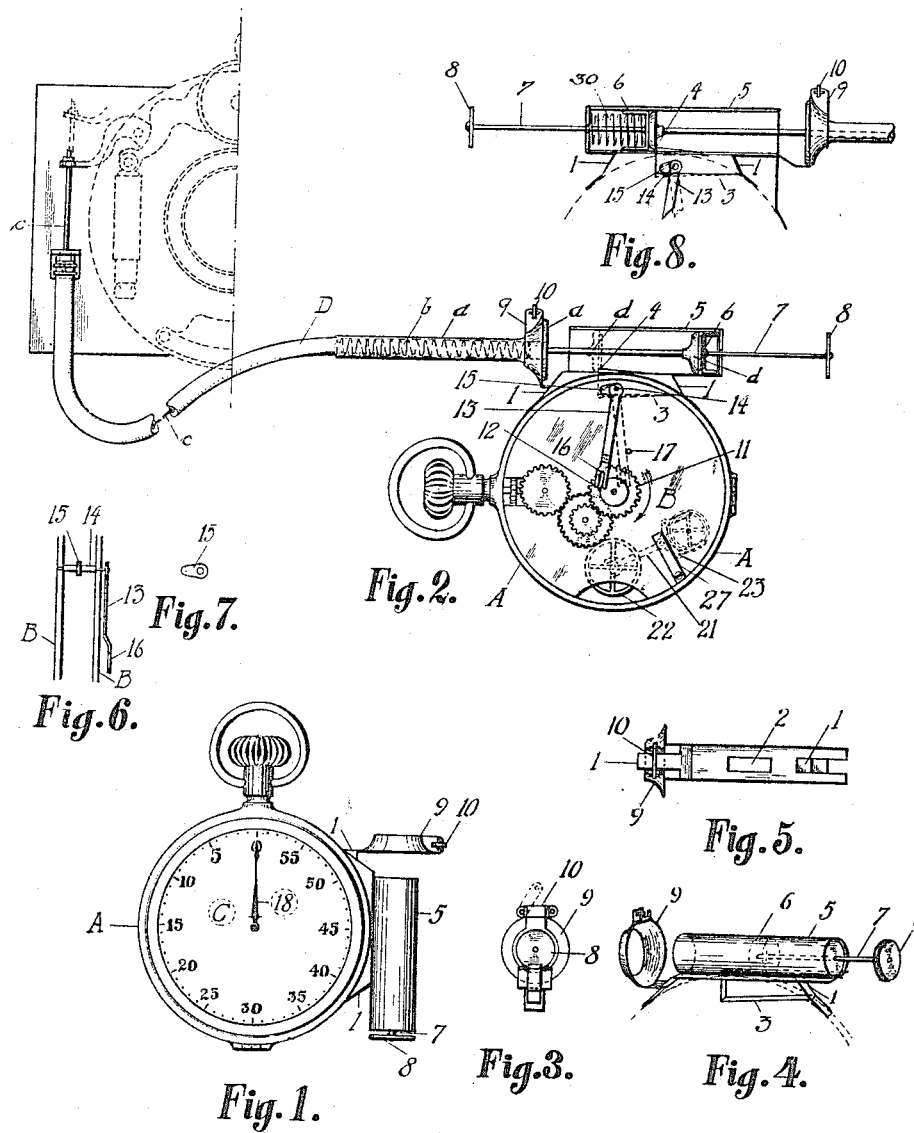

1,211,664.

Patented Jan. 9, 1917.
2 SHEETS—SHEET 2.

Ellie E. Bjorling
INVENTOR.

BY J. M. Thomas
ATTORNEYS.

UNITED STATES PATENT OFFICE.

ELLIS E. BJORLING, OF SALT LAKE CITY, UTAH.

CAMERA-SHUTTER-OPERATING DEVICE.

1,211,664.
Specification of Letters Patent.
Patented Jan. 9, 1917.

Application filed February 7, 1916. Serial No. 76,518.

*To all whom it may concern:*

Be it known that I, ELLIS E. BJORLING, a citizen of the United States, residing at Salt Lake City, in the county of Salt Lake and State of Utah, have invented certain new and useful Improvements in Camera-Shutter-Operating Devices, of which the following is a specification.

My invention relates to cameras, and has for its object to provide an economical and efficient time controlled shutter operating device, which may be operated by the works of an ordinary watch and which will automatically open the camera shutter at any predetermined period of time after it is set. This object I accomplish with the device illustrated in the accompanying drawings in which similar letters and numerals of reference indicate like parts throughout the several figures and as described in the specification forming a part of this application and pointed out in the appended claims.

Figure 9:
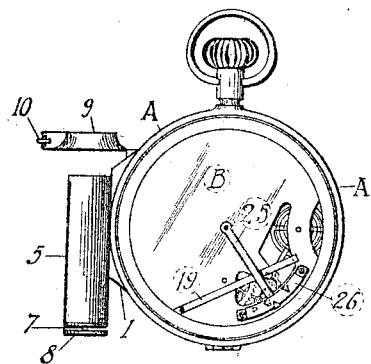
Figures 13, 14:
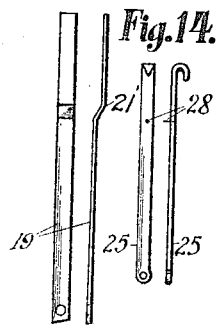
Figures 15, 16:
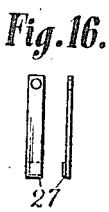
Figure 10:
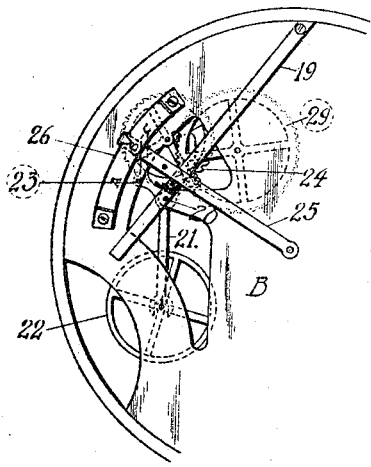
Figure 12:
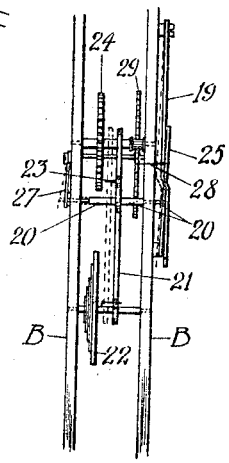
Figure 11:
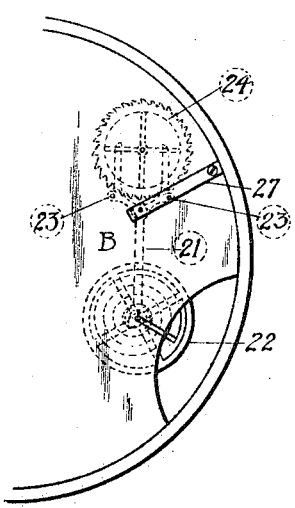

In the drawings in which I have shown a substantial embodiment of my invention, Figure 1 is the dial face of the device. Fig. 2 is a plan view of the device showing it connected with the camera by means of the shutter operating cable. Fig. 3 is an end elevation of the cable connection. Fig. 4 is a side elevation of the same with a portion of the dial case shown in dotted lines. Fig. 5 is a plan view of the cable connection. Fig. 6 is an edge view of the release lever in place on the cam shaft. Fig. 7 shows a plan view of the cam. Fig. 8 is a modification of the cable connection for use on cameras where the shutter is moved by inward movement of the cable instead of the outward movement shown in Fig. 2. Fig. 9 is the back face of the case shown with a glass cover. Fig. 10 is a plan view of the escapement regulation of an ordinary watch, which is changed in my invention to provide for quicker action than minutes of time to elapse before the exposure is made. Fig. 11 is a reverse plan view of the same parts of an ordinary watch with my improvements thereon. Fig. 12 is an edge view of the parts shown in Figs. 10 and 11. Fig. 13 is a plan and edge view of the shaft lever. Fig. 14 is a plan and edge view of the stop lever. Fig. 15 is a plan and edge view of the time guide. Fig. 16 is a plan and edge view of the shifting spring by which the escapement wheel shaft is longitudinally moved.

In the use of cameras it is frequently desired to make an exposure and take a picture after sufficient time has elapsed to allow the operator to assume a position, which will show him in the picture. At other times cameras are used to take pictures of wild animals or birds when the presence of the operator would frighten the animals or birds to be taken, and much use could be made of cameras had it been convenient to automatically open the shutter at some predetermined future time and make the exposure without the presence of the operator or manual operation of the shutter. These uses of the camera I have made possible by my invention which is extremely simple, economical and efficient as will be hereinafter explained and described.

Using the works of an ordinary watch and a case A, shown in Figs. 1, 2 and 9 in which said works are carried, wound, set and operated I am able with slight changes and by the use of other novel parts to set a camera, make an exposure, and take a picture within a few seconds, or after the lapse of minutes or hours as desired. A portion of the outer rim of said case A is cut away and a base plate 1 is fastened thereto, as a closure for this opening, having inclined end portions which are tangential to said case A. An open slot 2 is cut in said base 1 and a U-shaped flat spring 3 is fastened to said base plate 1 by one of its legs, so that said spring 3 may be operated at the free end transversely within said slot, and it is held normally with one of the free end corners above the said base, as shown at 4. A cylinder 5 is fastened on said base 1, which has a portion of the wall adjacent to said slot 2 cut away to receive the said free end corner 4 of said spring 3. A piston 6, having a rod 7 is operated within said cylinder and a thumb cap 8 is secured on the free end of said rod 7 for such operation. An axial opening is provided in the end piece of said cylinder through which said rod 7 is operated. A frusto-conically shaped guide piece 9 is fastened to said base 1 in alinement with, but spaced from said cylinder 5. A portion of said guide piece 9 is cut out and a retaining strap 10 is pivoted at one end to open and close the cut in said guide piece. On the side face of the gear wheel in a watch by which the minute hand of said watch is moved an upstanding pin or lug 12 is rigidly secured. A release lever 13 is fastened on one end of a shaft 14 which is journaled in the movement case B of said watch. A cam lever 15 is secured on said shaft 14 adjacent the said U-shaped spring 3. An open slot 16 is provided in the free end of said release lever 13, within which said upstanding pin 12 engages. Another pin 17 is secured in the said face to stop the movement of said lever 13. The common dial face of the watch is removed and a dial C is used in place thereof. The dial C has 48 dots placed thereon in a concentric circle and also has numerals 5, 10, 15 and consecutively to 55 placed concentrically on said face in anti-clockwise position. A hand 18 is fastened on the shaft of the minute gear of the watch and is operated similar to the minute hand of the ordinary watch and may be set in the same way and by the usual means.

In order that seconds of time or less periods than minutes may only need to elapse before exposure is made another change is made in the works of a common watch and other novel features are used in my device. On the back face of the movement case B of said watch a shaft lever 19 is riveted and so positioned that its free end portion is over the end of the shaft 20 on which the escapement lever 21 of the common watch is secured. The said shaft lever has its free end portion struck upwardly or bent to a higher plane than its other portion as shown at 21. A spring 27 is riveted to the face of case B, which is adjacent to said dial face C and said spring bears against the end of the shaft 20, and holds said shaft in the upper position. When the escapement lever 23 is in its normal position, herein called the lower position, and shown by dotted lines in Fig. 12 the device is set for longer periods of time than seconds to elapse before the exposure is made. In the position herein called the lower position the said escapement lever engages by means of the usual dogs or detents, and is moved by the balance wheel 22, and is regulated and runs under the common regulation devices. When said shaft 20 is pushed up by the pressure of said spring 27, applied on the lower end of said shaft the detents 23 are free, from the ratchet wheel 24, and the works of the watch will run wild or without proper regulation; but sufficiently accurate to answer the purpose of timing the release of the camera shutter for seconds. A stop lever 25 is pivoted at one end to the case B that is adjacent to the balance wheel of the watch, and said lever is placed at practically right angles across the shaft lever 19. The end portion of said lever 25 is bent upward and upon itself and made to engage the outer periphery of a time guide 26 made in the form of an arc. A laterally extended pin 28 is secured in the said stop lever 25, which pin may be made to engage in the teeth of the wheel 29. This engagement is used to stop the running of the watch. In order to start the watch, the lever 25 is moved on its pivot sufficiently to move the said pin 28 out of the teeth of wheel 29, and this feature of my device is used for the short or longer period of time and to start and stop the watch.

The assembling and operation of my device is as follows: The free end of the flexible shutter cable D is provided with a small tubular case $a$, within which is a spiral spring $b$, that normally holds the cable $c$ in such position that the shutter of the camera may be set to open by its spring $b$. A plunger having a thumb cap $d$ is manually operated to move said cable $c$ longitudinally in one direction, and the said spring $b$ moves it in the opposite direction. In the use of the cameras shown in Fig. 2, prior to my invention the operator was required to hold the cable $c$ with the thumb cap $d$ against the tubular case $a$ and with the spring $b$ compressed for such period of time as would make the exposure, and when he released the said spring $b$ the shutter of the camera would automatically close. In the present invention the strap 10 is moved on its pivot and the frusto-conically shaped guide piece 9 is opened. The thumb cap $d$ is inserted in the cylinder 5 and the end of the tubular case $a$ made to bear against said guide piece 9. The strap 10 is then turned into its normal position to hold the shutter cable $c$, the plunger and thumb cap $d$, the piston 6 and rod 7 in alinement. In this position the longitudinal movement of the rod 7 by manually pressing the cap 8 will move the cable $c$ and set the camera shutter so that when the spring $b$ is released the shutter will be opened and the exposure made. By pressing the cap 8 and moving the piston 6 within the cylinder 5 the corner 4 of the flat spring 3 will engage the thumb cap $d$ and hold it until the said spring 3 is moved. The operator sets the works of the watch so that the pin 12 is not in engagement with the slot in the end of the release lever 13, but as the gear wheel in which said pin 12 is moved around, the said pin 12 engages in the said slot 16 of the lever 13 and moves it on its pivot. This pivot being the shaft 14 is rotated and the cam lever 15 is moved and draws the corner 4 of said spring 3 out of the cylinder 5 and releases the thumb cap $d$, which in turn allows the spring $b$ to move the cable $c$ longitudinally and open the shutter of the camera. When the lever 13 is moved against the pin 17 it stops the running of the watch as the pin 12 engages in the slot 16 in the lever 13 and when the watch is running the lever 13 is moved toward the pin 17; when the lever strikes against said pin the watch stops as any impediment will stop the running of the train of gears of which the gear wheel that carries said pin 12 is a part. The hand 18 indicates the position of the lever 13 in its relation to the pin 12, and may be set so that the pin will engage said lever at the end of any period of time, say 45 minutes, by setting said hand 18 at the numeral 45 on the dial C, and starting the watch. When it has run 45 minutes the engagement will take place and the exposure be made. When the said lever 25 is set at B or C on the time guide 26 it does not press on the shaft lever 19 and the spring 27 holds the shaft 20 in its upper position and the device is ready for use for seconds of time to elapse before the exposure is made. Should it be the desire of the operator to take a picture within less than a minute, but at a definite period of time, he pushes the stop lever 25 around on the arc guide 26 until the said lever 25 is moved off of the bent up portion of the shaft lever 19, as at B, this engagement will free the shaft lever 19, and the spring 27 which bears against the end of the shaft 20 will move said shaft longitudinally and release the detents 23 from the usual engagement with the ratchet wheel 24. The works of the watch will then run wild as hereinbefore explained, and the same action of parts 11, 12, 13 and 17 will take place as before explained for taking exposures of more than minutes.

With cameras so constructed that the cable for the shutter operation must be pushed in, a modification of my device, such as shown in Fig. 8 is necessary, and in that event a spiral spring 30 is placed in the cylinder 5. To set the spring 3 into engagement with thumb cap $d$ pressure is applied to compress the spring $b$, and when the lever 13 strikes pin 17 the spring 3 is withdrawn from its engagement with cap $d$ and the spring 30 moves the cable $c$ against the pressure of spring $b$.

Having thus described my invention I desire to secure by Letters Patent and claim:—

1. In a camera-shutter-operating device the combination with a train of spring moved gear wheels, of a pin projecting from the side face of one of said gear wheels; a lever having an open slot in one end and pivoted adjacent to the side face of the same gear wheel; a shaft on which said lever is secured; a cam lever fastened on said shaft; a spring movable by said cam lever; a camera shutter cable; means to secure the free end of said camera shutter cable adjacent said spring; and a manually operated piston adjacent said spring and adapted to move said shutter cable longitudinally and to permit engagement of the corner of said spring with said cable.

2. In a camera-shutter-operating device the combination with the works of an ordinary watch; of a case having an opening in its periphery and in which said works are carried, wound, set and operated; a base plate secured tangentially on said case and provided with an opening in alinement with the opening in said case; a spring movable transversely through said openings; a camera shutter cable; means to detachably fasten the free end of said camera shutter-cable adjacent said spring; a manually operated piston adapted to move said camera shutter cable longitudinally to be engaged by said spring; a rocking lever pivoted in the frame of said watch works one arm adjacent to said spring and the other arm adjacent to the side of the minute gear of said watch and provided with an open slot in the end of said arm; and a projecting pin secured in the minute gear of said watch adapted to engage in said slot whereby the movement of said gear may be imparted to said rocking shaft to compress said spring.

3. In a camera-shutter-operating device the combination with the works of a common watch; a case in which said works may be wound, set and operated, and having a slotted opening in its periphery; a spring operable within said opening; a camera shutter cable; means to detachably fasten the free end of said camera shutter cable on said spring; a rocking lever having one arm adjacent and adapted to move said spring, and the other arm movable by the gear wheel whose shaft carries the minute hand of a watch.

4. In a camera shutter operating device the combination with a train of gears; a case in which said gears may be wound, set and operated, and having a slotted opening in the periphery; a spring movable in said opening; a camera shutter cable; means to detachably fasten one end of said camera cable on said spring; a lever movable on its fulcrum by the operation of said gears; a fulcrum shaft for said lever; and means on said shaft to trip said spring.

In testimony whereof I have affixed my signature in presence of two witnesses.

ELLIS E. BJORLING.

Witnesses:
A. G. FALKENSTEIN,
SAM RANEY.

Copies of this patent may be obtained for five cents each, by addressing the "Commissioner of Patents, Washington, D. C."